June 4, 1968 L. LAZARE 3,386,913
PROCESS FOR REDUCING SALT CONTENT OF SALT CONTAINING WATER
Filed Dec. 30, 1965 4 Sheets-Sheet 1
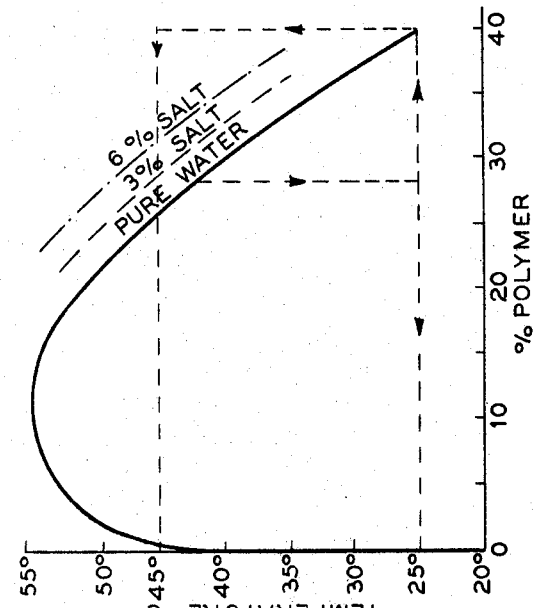
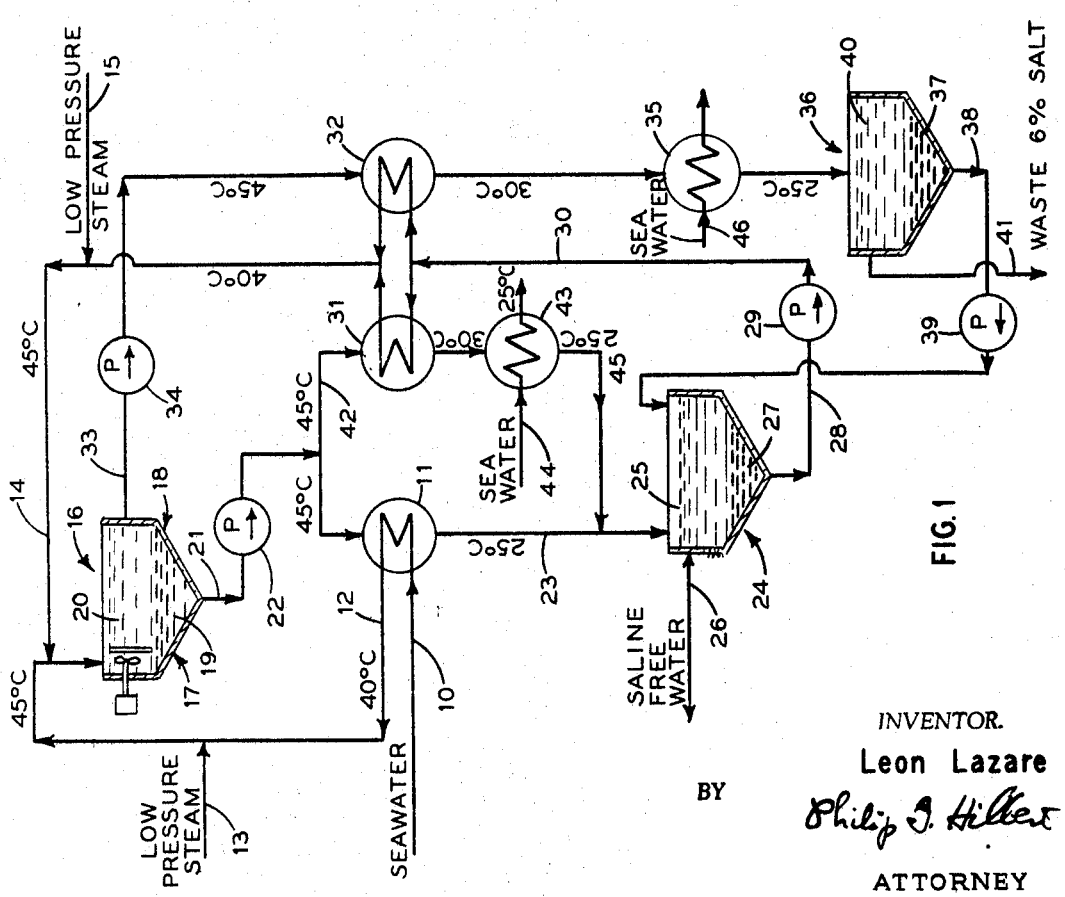
INVENTOR.
Leon Lazare
BY
Philip G. Hilbert
ATTORNEY INVENTOR.
Leon Lazare

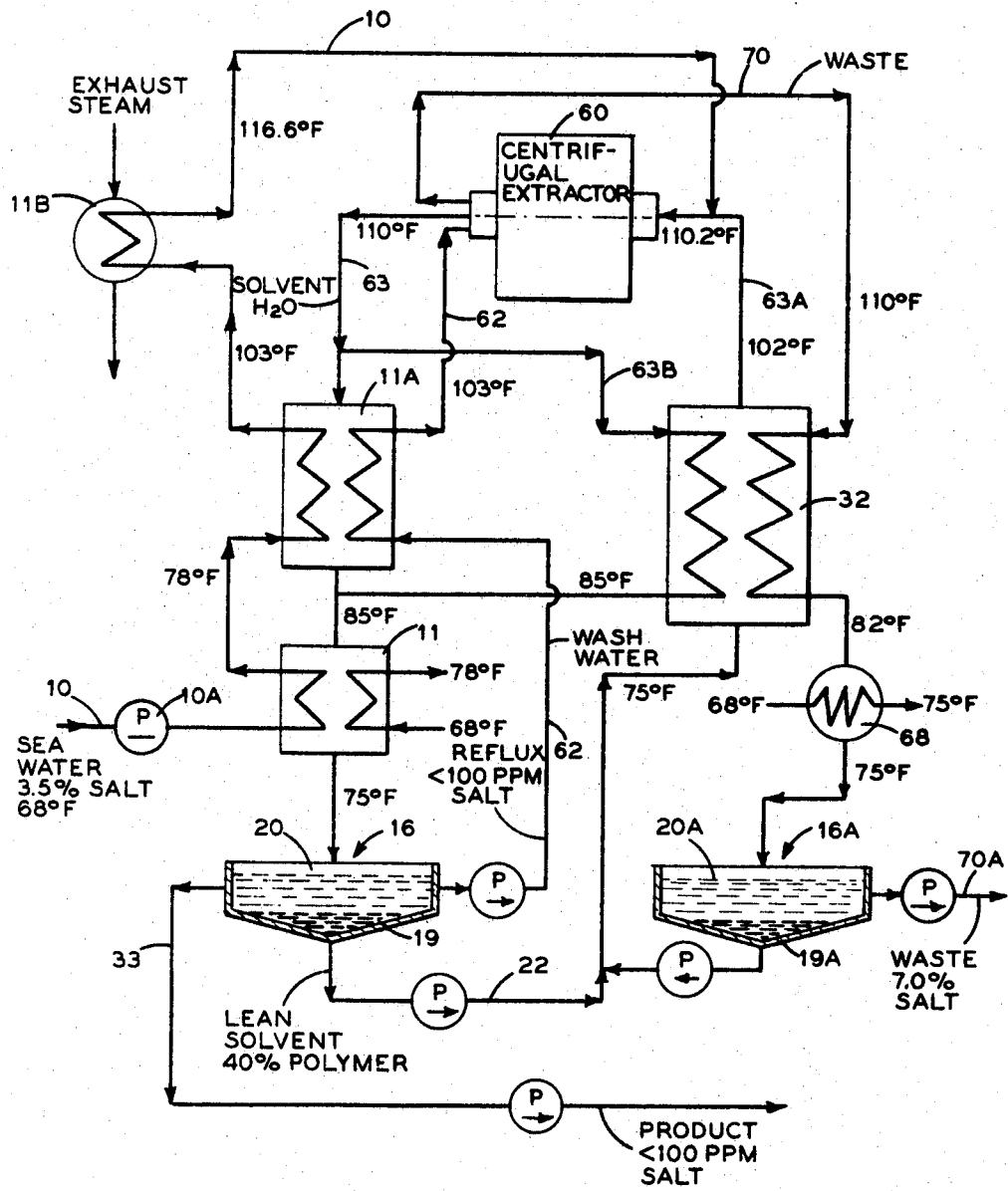

United States Patent Office 3,386,913
Patented June 4, 1968

3,386,913
PROCESS FOR REDUCING SALT CONTENT OF
SALT CONTAINING WATER
Leon Lazare, Stamford, Conn., assignor to The Puraq
Company, New York, N.Y., a partnership
Continuation-in-part of application Ser. No. 423,975,
Jan. 7, 1965. This application Dec. 30, 1965, Ser.
No. 517,625
17 Claims. (Cl. 210—22)

This application is a continuation-in-part of application Ser. No. 423,975, filed Jan. 7, 1965, now abandoned.

This invention relates to a process for reducing the salt content of salt containing water; and more particularly concerns a process for desalinating sea water.

An object of this invention is to provide an improved process for treating salt containing water such as sea water to markedly reduce the saline content thereof; the process being distinguished by minimized requirements for power, heat and chemicals, whereby to achieve substantial reductions in processing costs, as well as simplifying equipment requirements so as to also reduce capital investment per unit of treated water end product.

In known desalinating procedures of the multiple flash evaporator or still type; electrodialysis and freezing procedures, and modifications thereof, the required apparatus for handling large quantities of water to be treated, involves substantial capital investment, as well as high operating costs for power, heat and refrigeration; all of which is reflected in relatively high overall costs per unit of water treated.

Accordingly, a further object of this invention is to provide an improved process of the character described wherein the system is of simple, economical construction; and the necessary power, heat and refrigeration, and chemicals are minimal so as to leave the overall cost per unit of water recovered, at a value materially less than that accruing from the most efficient, known procedures.

A further object of this invention is to provide an improved process for treating salt containing water wherein saline free water is continuously extracted from a continuous stream of salt containing water by contacting the same with a selected solvent having a large capacity for water enrichment at a critical temperature related to the solvent; the water enriched solvent being separable at another temperature into substantially solvent free water and solvent phases, thereby providing a potable water product; while permitting the solvent phase to be continuously recycled to continuously extract further amounts of water of reduced saline content from the salt containing water.

Still another object of this invention is to provide in a process of the character described, procedure for effecting maximum recovery of solvent during the extractive operations so as to leave minimal amounts of solvent in the recovered water product and to minimize solvent losses during the extractive operations.

Other objects of this invention will in part be obvious and in part hereinafter pointed out.

In the drawings, FIG. 1 is a diagrammatic showing of a process for treating salt containing water, in accordance with the invention;

FIG. 4 is a phase diagram for a selected solvent-water system, utilizing the invention and having an upper critical solution temperature;

FIG. 6 is a diagrammatic showing of a system similar to that of FIG. 3, but based on a solvent of the upper critical temperature type.

Figure 2:
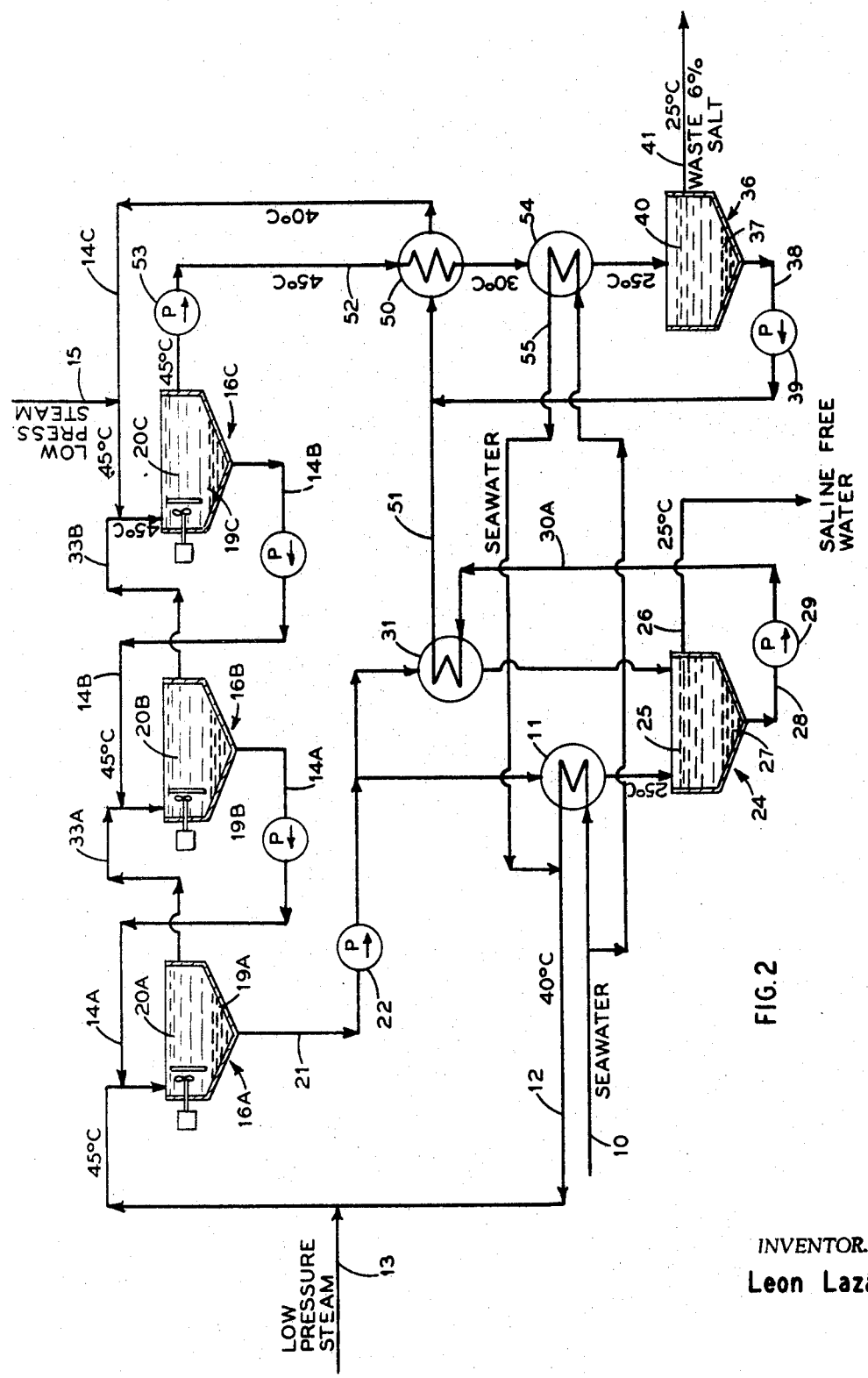
FIG. 2 is a showing similar to that of FIG. 1, wherein the extractive procedure is carried out in multiple stages.

If consideration is given to temperature-concentration relationships of aqueous solutions of selected partially water soluble polymers with a given solvent-polymer energy of interaction such that a region of phase separation exists, there will be noted a strong degree of asymmetry in the composition of the coexistent phases. Thus, the polymer rich phase at a temperature somewhat below the critical phase separation temperature, contains a large proportion of water, said 30–60%. On the other hand, the coexistent aqueous phase contains little or no polymer solvent.

For the selected polymer solvent, as the temperature is decreased, the mutual solubility of polymer and water in the two phases decreases, but for the aqueous phase, the solubility of polymer rapidly decreases to an order of magnitude of parts per million of water. The presence of salt in the aqueous phase (3–7%) does not materially alter the nature of a given temperature-concentration relationship for a given polymer solvent except to displace the curve slightly upward so as to increase the critical phase separation temperature by a few degrees.

Thus, it has been found that by proper combination of hydrophilic and hydrophobic monomers; copolymers are formed which will provide various desired temperature-concentration relationships. The shape of such curve may be further modified by the adjustment of the molecular weight of the copolymer and the exact degree of hydrophilia and hydrophobia of the constituent monomers. This is usually indicated by the dielectric constant of the copolymer. Furthermore, three or more monomers may be copolymerized for additional adjustment of the desired curve.

Accordingly, in accordance with the instant invention, water of reduced saline content may be extracted from sea water or brackish water in a single stage of operation or by multiple stages operating countercurrently with the salt containing water passing through the successive stages to progressively augment its original salt content while simultaneously losing a portion of its water content to a polymer solution passing through the stages and thus increasing the water content of the polymer solution.

In such countercurrent operation, it is advantageous to have operational temperatures changing from stage to stage with the saline stream giving up heat to the polymer rich stream, thus achieving a considerable reduction in heat requirements.

In either the single or multiple stage operation, extraction takes place at elevated temperatures which may be a few degrees less than the upper critical solution temperature of the selected polymer solvent in respect to water or salt containing water, thereby giving a solvent extract saturated with saline free water. Cooling the extract by countercurrent heat exchange with incoming salt containing water, to a determined temperature will result in phase separation to provide an aqueous phase containing less than two parts per million of dissolved polymer solvent; and a polymer rich phase which may be recycled through the extractive stage or stages of the process.

Essentially, the process of the instant invention involves the use of selected low molecular weight, low viscosity copolymers which are partially water soluble; the aqueous solution of such copolymers having a high extractive power for water at certain critical temperatures; the water enriched solutions being subject to phase separation at other critical temperatures to provide a water phase which is substantially free of copolymer and thus available as a potable product; and a polymer rich phase for recycling for further extractive operations.

More particularly, the selected polymer solvent which has a molecular weight of at least about 5,000 has an upper critical solution temperature, i.e., the polymer is completely miscible with water above such temperature; and at temperatures below said critical temperature, will separate into (1) a phase which is relatively rich in polymer (over 15% polymer) and (2) an aqueous phase which is practically devoid of polymer. As the temperature is lowered relative to said critical solution temperature, the aqueous phase exhibits progressively reduced proportions of polymer which asymptotically approach zero.

On the other hand, the coexistent polymer rich phase will concurrently become richer in its polymer content and may rise to over 40%.

Further, certain selected polymer solvents may exhibit lower critical solution temperatures such that at temperatures below such critical temperature, the miscibility of the polymer in water will be complete in all proportions, but with increasing temperatures above said critical solution temperature there will be two coexistent phases: (1) an aqueous phase which will show decreasing concentrations of polymer; and (2) a polymer rich phase which will show increasing polymer proportions with increasing temperatures.

In FIG. 1 is shown a single stage system embodying the invention and utilizing a solvent of the upper critical solution temperature type, wherein 10 designates a supply line carrying water having a saline content, and may be sea water or brackish water. The temperature of the water in line 10 is raised from about 20° C. to about 40° C. by passing the same through a heat exchanger 11. From exchanger 11, the water passes in line 12 with an injection of low pressure steam at 13 to raise the temperature thereof to about 45° C.

Line 12 is joined by a supply line 14 carrying an aqueous solution of partially water soluble copolymer, hereinafter described in detail, which is at a temperature of about 45° C., low pressure steam being injected into line 14 and 15. The mixture of saline water and copolymer solution pass into a mixer-extraction tank 16, by way of a mixing chamber 17 thereof and thence into a settling chamber 18 thereof.

In tank 16, the copolymer solution will extract water from the saline solution to form a lower stratum 19 of water enriched solvent solution and an upper stratum 20 of saline solution having an increased proportion of salt. The lower stratum 19 passes from tank 16 by way of line 21 and pump 22 at its elevated temperature to heat exchanger 11 where its heat is given up to raise the temperature of the incoming salt containing water in supply line 10, thus cooling the polymer solution to about 25° C. and passing by line 23 to a separator tank 24.

At the indicated reduced temperature, the copolymer solution enriched as to its water content, undergoes phase separation to provide an upper stratum 25 of water substantially free of copolymer, the polymer content being less than 5 parts per million of water; and is drawn off in product line 26.

In tank 24 there is also formed a lower stratum 27 of an aqueous solution of copolymer solvent which is solvent rich and passes by line 28 and pump 29 to a line 30 to a pair of heat exchangers 31, 32 where the temperature of the solution is raised to about 40° C.; exchanger 31 receiving a portion of water enriched solvent from line 21 at a temperature of about 45° C. From exchanger 31, the copolymer solution passes to line 14, as previously described, to recycle and extract substantially saline free water from water having a salt content in tank 16.

The upper stratum 20 of salt enriched water passes from tank 16 by way of line 33 and pump 34 at a temperature of about 45° C. to heat exchanger 32 to give up its heat to raise the temperature of a portion of the solvent rich copolymer in line 33. The salt water leaving exchanger 32 which may have a salt content of about 6-7% now passes directly to waste, or alternatively, may pass to a heat exchanger 35 for cooling to about 25° C. and thence to a separator tank 36 where residual copolymer solution will separate as a lower layer 37 to pass by line 38 and pump 39 to separator tank 24 for further recovery of copolymer solvent. The salt rich upper layer 40 in tank 36 may now pass to waste by line 41.

Another portion of water enriched solvent from line 21 at 45° C. passes by line 42 through heat exchanger 31, as previously described, cooling the same to about 30° C. and then passes to a heat exchanger 43 which is cooled by a salt water line 44 at 20° C., to about 25° C. and passes by line 45 to line 23 and thence to separator 24 for phase separation as previously described. Heat exchanger 35 is similarly cooled by salt water at 20° C. in line 46.

The separatory and extractive procedure using a solvent of the upper critical solution temperature type may also be carried out in multiple stages, as shown in FIG. 2. Here the salt containing water or sea water is progressively treated in successive extractive tanks with copolymer solvent solution in countercurrent relation, whereby the solvent solution is progressively enriched with water while the saline solution progressively increases its saline content. The water enriched solvent solution is then subjected to phase separation to provide a potable water having little or no saline content and copolymer solution for recycling in the system.

Thus, as shown in FIG. 2, salt containing water at 20° C. in feed line 10 passes through heat exchanger 11 to have its temperature raised to about 40° C. and thence by line 12 and steam injector 13 at a temperature of about 45° C. to meet copolymer solvent solution in a supply line 14A for mixture and extraction in tank 16A, similar to tank 16 previously described. The water enriched layer 19A in tank 76A passes by line 21 and pump 22 to heat exchanger 11 for cooling to a temperature of about 25° C. for phase separation in tank 24, where the aqueous phase substantially free of copolymer solvent passes as product by line 26.

The copolymer solvent phase 27 in tank 24 is recycled by line 28 and pump 29 to line 30A and thence to heat exchanger 31 for raising its temperature, through a portion of the hot, water enriched copolymer solution passing from line 21 through said exchanger. From exchanger 31, the copolymer solution passes to heat exchanger 50 by way of line 51 to be heated to about 40° C. and thence by line 14C to meet salt containing water in line 33B for extraction in the third stage tank 16C, low pressure steam being injected at 15 to bring the combined streams to a temperature of about 45° C.

The lower stratum 19C of water rich copolymer solution in tank 16C passes to line 14B to meet saline enriched water in line 33A from extraction tank 16A, for extracting water therefrom in tank 16B where the lower stratum 19B of copolymer solution passes to line 14A. Low pressure steam may be injected at appropriate points in the system to maintain the extraction temperature of about 45° C. for the selected copolymer solution.

It will be apparent that as the copolymer solution passes through the successive extraction tanks 16C, 16B and 16A, the proportion of water thereof will progressively increase while the salt containing water passing through said extraction tanks will show a progressive increase in its saline content. Thus in the case of the treatment of sea water, the water leaving tank 16C with a saline content of 6-7% and at a temperature of about 45° C., passes by line 52 and pump 53 to be cooled in heat exchanger 50 to about 30° C. and thence to a heat exchanger 54 cooled by a sea water line 55 to about 25° C. and thence to a separator tank 36 where any copolymer solution will separate out as a lower layer 37 and which passes to heat exchanger 50 via line 38 and pump 39 for recycling in line 14C.

In the systems shown in FIG. 1 and FIG. 2, using a sea water feed pumped at a rate of about 2000 gallons/hr. with 1000 gallons/hr. of saline free water being extracted to pass in product line 26; 1000 gallons/hr. of salt enriched sea water from upper layer 40 in tank 36 will pass to waste by way of line 41. About 2500 gallons/hr. of concentrated copolymer solution is used in the extractive process; small amounts of new copolymer solution being added periodically to make up for losses in the cycling procedure.

The copolymer solution used for extraction and phase separation is selected so as to have a desired phase separation relation in respect to water in terms of temperature and concentration differentials. To this end, the copolymer is derived from hydrophilic and hydrophobic monomers copolymerized to produce a low molecular weight product of low viscosity.

Thus, the copolymer used in the single and multiple stage systems described above, may be formed by copolymerizing 30 parts of vinyl alcohol with 70 parts of methyl vinyl ketone, all by weight. Such a combination will exhibit a concentration-temperature relationship as shown in FIG. 4, wherein the copolymer at 45° C. with a concentration of 40% can take on water to reduce the copolymer concentration to about 28.3% at 25° C., phase separation takes place to restore the copolymer concentration to 40% as indicated. This copolymer applicable to the systems of FIGS. 1, 2 is of the upper critical solution temperature type.

Another example of copolymer of the upper critical solution temperature type, would be made by copolymerizing 50 parts of maleic acid diester of propylene glycol and butyl alcohol, with 50 parts of maleic acid diester of propylene glycol and octyl alcohol. In another example, the solvent is made by copolymerizing 80 parts of propylene glycol methacrylate and 20 parts of methyl methacrylate.

Various other combinations of monomers may be copolymerized to provide a solvent of the upper critical solution temperature type, using elected proportions of (A) vinyl alcohol or maleic acid diester of propylene glycol and butyl alcohol, or propylene glycol methacrylate, or methyl vinyl ether; and (B) methallyl alcohol, or methyl vinyl ketone, or maleic acid diester of propylene glycol and octyl alcohol, or methyl methacrylate, or acrylonitrile, or styrene.

Figure 5:
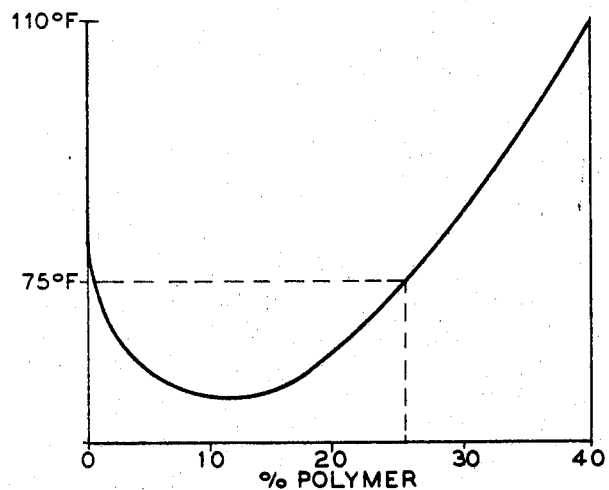
FIG. 5 is a phase diagram similar to that of FIG. 4 but based on a solvent having a lower critical solution temperature.

For making copolymer solvents of the lower critical solution temperature type, monomers selected from the group (A) vinyl pyrrolidone, acrylamide, ethyleneimine, hexamethylene imine, vinyl carbazole, may be copolymerized with monomers selected from group (B) above, or vinyl pyridine. A typical temperature concentration curve for this type of copolymer is shown in FIG. 5 wherein the copolymer is made by copolymerizing 50 parts of vinyl pyrrolidone with 50 parts of vinyl pyridine, all by weight.

In addition, partially substituted cellulose ethers such as the methyl or ethyl ethers may be used as solvent of the low critical solution temperature type. In such ethers the degree of substitution is 0.15 to 0.30 ether groups per glucose unit.

It is understood that the selection of two, three or more monomers from the groups A and B, above, the temperature-concentration curve may be adjusted as desired. Preferably, the copolymer should be of low molecular weight, ranging from about 5,000 to about 10,000; although the range may encompass weights of from 3,000 to about 20,000. Also, the viscosity of the copolymers should be of a relatively low order of magnitude for optimum operation of the systems.

Variations in temperature of the incoming saline feed may require adjustment in the nature of the copolymer solvent used, as by adjusting the proportions of the monomer making up the copolymer.

Figure 3:
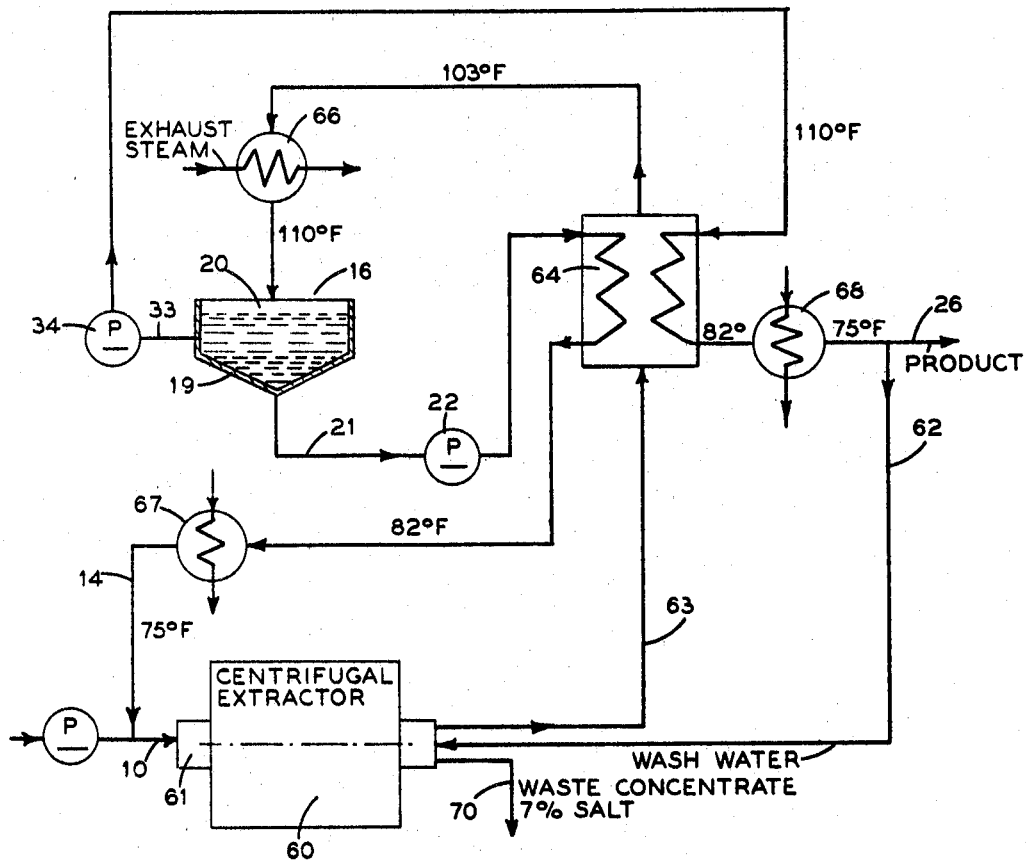
FIG. 3 is a diagrammatic showing of a process providing an alternative embodiment of the invention and utilizing a solvent of the lower critical solution temperature type.

In FIG. 3 is shown an alternative form of single stage extraction and separation system using solvents of the lower critical solution temperature type, wherein the supply line 10 carrying salt containing water such as 3.5% salt containing sea water is mixed with a selected concentrated copolymer solvent at about 75° F. in line 14 and passed to a conventional Podbielniak centrifuge separator 60 which rotates about a horizontal axis in a known manner, by way of an input port 61 thereon.

Wash water from product line 26 also passes into separator 60 at 75° F., by way of line 62, while water enriched copolymer solution leaves separator 60 by way of line 63 passing to a heat exchanger 64 where the temperature of the solvent is raised to about 103° F. and thence by a line 65 to a heat exchanger 66 heated by exhaust steam, to further increase the temperature of the water enriched copolymer to about 110° F., which then passes to separator tank 16.

In tank 16, phase separation occurs with a lower stratum 19 of concentrated copolymer solution passing by way of line 21 and pump 22 to heat exchanger 64 where the same is cooled to 84° F. and thence passes to a heat exchanger to effect a further cooling to about 75° and thence by way of line 14 to the separator 60. The upper stratum 20 in tank 16 comprising water substantially free of solvent, passes by way of line 33 and pump 34 to heat exchanger 64 where the temperature is reduced to about 82° F. and thence to a heat exchanger 68 where the temperature is further reduced to about 75° F. and thence passes to product line 26, a portion thereof providing wash water for line 62.

The Podbielniak separator 60 is highly effective in washing the water rich copolymer solution free of salt and the concentrated salt solution having up to 7% salt passes from separator 60 to waste by way of line 70.

In FIG. 6 is shown a modification of the system of FIGS. 1, 2, based on a solvent of the upper critical solution temperature type. Here the saline feed line 10, carrying sea water with a salt content of 3.5%, at 68° F. passes by way of pump 10A to heat exchanger 11 where the temperature of the feed is raised to 78° F., and then passes to a second heat exchanger 11A where the temperature of the feed is raised to 103° F. and then passes to a third heat exchanger 11B, operating with exhaust steam, where the temperature of the feed is further raised to 116.6° F.

The feed from heat exchanger 11B is supplied to the input side of a Podbielniak centrifuge separator 60, as previously described in connection with FIG. 3, together with a solvent of the upper critical solution temperature type brought in by line 62.

Water enriched solvent leaves separator 60 by line 63 at a temperature of 110° F., and passes through heat exchangers 11A, 11 whereby the temperature thereof is reduced successively to 85° F. and 75° F., and then passes to separation tank. Here the upper stratum 20 of potable water passes to product line 33.

The lower stratum 19 in tank 20 of lean solvent, passes by line 22 to heat exchanger 32 where the temperature thereof is raised from 75° to 102° F. and then passes to line 63A to join the saline feed in line 10 at 116.6° F. to provide a mixture at 110.2° F. for admission to centrifuge separator 60.

Centrifuge 60 is provided with wash water from a line 62 extending from stratum 20 of tank 16, by way of heat exchanger 11A which raises the temperature of such wash water from 75° F. to 103° F.

A portion of the mixture of solvent and water from centrifuge 60 passes by way of line 63B to heat exchanger 32 and thence at a reduced temperature of 85° F. to heat exchanger 11.

Water of increased saline content (7.0%) passes out of centrifuge 60 by way of line 70 at 110° F., thence through heat exchanger 32 where the temperature thereof is reduced to 82° F. and thence to a heat exchanger 68 cooled by water at 68° F., to a temperature of 75° F. The waste products then pass to a separator tank 16A where residual solvent in lower stratum 19A passes to line 22, while the high saline content water from upper stratum 20A passes out by waste line 70A.

What is claimed is:

1. The method of reducing the salt content of salt containing water comprising mixing such water with an aqueous solution of a polymeric solvent compound, said solvent compound being used in an amount to maintain said solution in a liquid state at all times, at a given temperature to form a liquid body having a stratum of water enriched solvent compound solution and a stratum of salt enriched water, drawing off the stratum of water enriched solvent compound solution and changing the temperature thereof with respect to said given temperature whereby said water enriched solution forms an aqueous phase substantially free of solvent compound and an enriched solvent liquid phase, and drawing off said aqueous phase.

2. The method of claim 1 wherein the polymeric solvent compound is selected from the group consisting of partially substituted ethyl and methyl cellulose ethers and low molecular weight partially water soluble copolymers of hydrophilic and hydrophobic monomers and wherein the hydrophilic monomer of said copolymer is selected from the group consisting of vinyl alcohol, maleic acid diester of propylene glycol and butyl alcohol, propylene glycol methacrylate, methyl vinyl ether, vinyl pyrrolidone, acrylamide, ethyleneimine or vinyl carbazole; and the hydrophobic monomer of said copolymer is selected from the group consisting of methallyl alcohol, methyl vinyl ketone, maleic acid diester of propylene glycol and octyl alcohol, methyl methacrylate, acrylonitrile, styrene and vinyl pyridine.

3. The method as in claim 1 wherein said polymeric solvent compound has a molecular weight of from about 3,000 to about 20,000.

4. The method as in claim 1 wherein said stratum of salt enriched water is drawn off and the temperature thereof changed to cause separation of any residual solvent compound solution and recovering said solvent compound solution.

5. A method as in claim 1 wherein said given temperature is somewhat less than the critical phase separation temperature of said aqueous solvent compound solution to extract water from said salt containing water and to increase the water content of said solvent compound solution while increasing the salt content of said salt containing water, reducing the temperature of the water enriched solvent compound solution to a point where said solution separates into an aqueous phase substantially free of solvent compound and a solvent compound rich liquid phase, and drawing off said aqueous phase.

6. A method as in claim 1 wherein said mixture of salt containing water and solvent compound solution is washed with water while subjected to centrifugation to provide said stratum of water enriched solvent compound solution and said stratum of salt enriched water.

7. A method as in claim 1 wherein the solvent compound of said solvent compound solution is completely miscible with water at temperatures above said given temperature, and at temperatures below said given temperature, said solvent compound solution will separate into an aqueous phase and a solvent compound liquid phase.

8. A method as in claim 1 wherein the solvent compound of said solvent compound solution is completely miscible with water at temperatures below said given temperature, and at temperatures above said given temperature, said solvent compound solution will separate into an aqueous phase and a solvent compound liquid phase.

9. A method as in claim 1 wherein said salt containing water and said solvent compound solution are passed in countercurrent mixing relation through successive extraction stages to form in each stage a layer of water enriched solvent compound solution and a salt enriched water layer, the water content of the water enriched solvent compound solution increasing progressively in the successive stages while the salt content of the salt enriched water layers increase progressively in the successive stages, removing the water enriched solvent compound solution from the stage having the maximum water content, changing the temperature of the last mentioned solvent compound solution to a value effective to cause phase separation therein providing an aqueous phase substantially free of solvent compound solution and an aqueous enriched solvent compound solution phase and drawing off said aqueous phase.

10. A method as in claim 9 and further including the step of removing the salt enriched water layer from the stage of maximum salt content, changing the temperature thereof to a value wherein any residual polymeric solvent compound solution will separate from the salt enriched water layer, and recovering said residual solvent compound solution.

11. The method of desalinating sea water comprising mixing sea water with an aqueous solution of low molecular weight partially water soluble copolymer of hydrophilic and hydrophobic monomers at an elevated temperature to form a stratum of water enriched copolymer solution and a stratum of sea water of increased saline content, drawing off the stratum of water enriched copolymer solution and reducing the temperature thereof to a point wherein said solution forms an aqueous phase substantially free of copolymer and an enriched copolymer phase, and drawing off said aqueous phase.

12. The method of claim 11 wherein said copolymer has a molecular weight of from about 3,000 to about 20,000.

13. The method of claim 11 wherein said stratum of sea water of increased saline content is drawn off and reduced in temperature to cause separation of any residual copolymer solution and recovering said copolymer solution.

14. A method of desalinating sea water comprising passing sea water and an aqueous solution of partially water soluble, low molecular weight copolymer formed of hydrophilic and hydrophobic monomers, in countercurrent mixing relation through successive extraction stages to form in each stage a layer of water enriched copolymer solution and a layer of salt enriched sea water, the water content of the water enriched copolymer solution increasing progressively in the successive stages while the salt content of the sea water layer is increasing progressively in the successive stages, removing the water enriched copolymer solution from the stage having the maximum water content, reducing the temperature of the last mentioned copolymer solution to cause phase separation thereof into an aqueous phase substantially free of copolymer and an aqueous enriched copolymer phase, and drawing off said aqueous phase.

15. A method as in claim 14 and further including removing the salt enriched sea water layer from the stage of maximum salt content, reducing the temperature of said enriched sea water layer to a point wherein any residual copolymer solution will separate out, and recovering said residual copolymer solution.

16. A method of desalinating sea water comprising mixing sea water and an aqueous solution of partially water soluble, low molecular weight copolymer formed from a hydrophilic monomer and a hydrophobic monomer at a given elevated temperature somewhat less then the critical phase separation of said aqueous solution of copolymer to extract water from the sea water and to increase the water content of said copolymer solution while increasing the salt content of the sea water, separating the water enriched copolymer solution from the salt enriched sea water, reducing the temperature of the water enriched copolymer solution to a point where said solution separates into a water phase substantially free of copolymer and a copolymer rich phase, and drawing off said aqueous phase.

17. A method as in claim 16 wherein said copolymer has a molecular weight of from about 5,000 to about 10,000.

References Cited

UNITED STATES PATENTS 3,234,126  2/1966  Bloch _____ 210—59

MICHAEL E. ROGERS, *Primary Examiner.*